US010475092B1

(12) United States Patent
Patterson (10) Patent No.: US 10,475,092 B1
(45) Date of Patent: Nov. 12, 2019

(54) SYSTEM AND METHOD FOR ONLINE TIME-PRICE BASED MARKETPLACE AND UNIQUE MANIPULATIONS OF LISTINGS

(71) Applicant: Patterson Programming, Inc., Putnam Valley, NY (US)

(72) Inventor: William Spencer Patterson, Putnam Valley, NY (US)

(73) Assignee: Patterson Programming, Inc., Putnam Valley, NY (US)

( * ) Notice: Subject to any disclaimer, the term of this patent is extended or adjusted under 35 U.S.C. 154(b) by 0 days.

(21) Appl. No.: 16/106,527

(22) Filed: Aug. 21, 2018

(51) Int. Cl.
*G06Q 30/02* (2012.01)
*G06Q 30/06* (2012.01)
*G06F 3/0484* (2013.01)
*G06F 16/95* (2019.01)

(52) U.S. Cl.
CPC ..... *G06Q 30/0284* (2013.01); *G06F 3/04847* (2013.01); *G06F 16/95* (2019.01); *G06Q 30/0611* (2013.01); *G06Q 30/0641* (2013.01)

(58) Field of Classification Search
USPC ................................ 705/37, 39, 38, 44, 26.1
See application file for complete search history.

(56) References Cited

U.S. PATENT DOCUMENTS

| | | | | |
|---|---|---|---|---|
| 5,890,138 A * | 3/1999 | Godin | ..................... | G06Q 20/04 705/26.3 |
| 7,213,754 B2 * | 5/2007 | Eglen | ..................... | G06Q 30/06 235/380 |
| 7,693,748 B1 * | 4/2010 | Mesaros | ................. | G06Q 30/06 705/1.1 |
| 7,930,340 B2 * | 4/2011 | Arunachalam | ........ | G06Q 20/04 709/202 |
| 8,204,818 B1 * | 6/2012 | Aggarwal | .......... | G06Q 30/0241 705/37 |

(Continued)

OTHER PUBLICATIONS

Takuma Oide, Toru Abe, Takuo Suganuma, A broker-less participatory sensing scheme by user matching mechanism based on market price approach, Mar. 1, 2016, 2016 IEEE International Conference on Pervasive Computing and Communication Workshops (PerCom Workshops) (pp. 1-6). (Year: 2016).*

(Continued)

*Primary Examiner* — Tien C Nguyen
(74) *Attorney, Agent, or Firm* — John H. Choi & Associates (57) ABSTRACT

A system and method host an electronic marketplace in which the initial product prices are set by the selling party and the final purchase price is determined by the time between product posting and payment from a buyer. Gamification is implemented using purchasable powerups to allow users to manipulate the prices during a product listing. The seller has two options for the increment or decrement rate of the price of the product: automatic or manual. In the automatic incrementation, the system increments or decrements the final price by cross-referencing the time and the product seller's inputted choice of UP or DOWN at the time of posting. In the manual incrementation, the seller selects the speed in which the price is increased or decreased from the start to the end of the product listing based on the seller's inputted choice of UP or DOWN at the time of posting.

18 Claims, 5 Drawing Sheets

(56) References Cited

U.S. PATENT DOCUMENTS

| | | | | |
|---|---|---|---|---|
| 8,396,752 | B2* | 3/2013 | Hatfield | G06Q 30/0206 705/26.1 |
| 8,473,347 | B1* | 6/2013 | Koningstein | G06Q 30/02 705/14.4 |
| 8,533,061 | B2* | 9/2013 | Asher | G06Q 30/0623 705/26.3 |
| 8,788,343 | B2* | 7/2014 | Burdick | G06Q 30/02 705/14.4 |
| 9,460,464 | B2* | 10/2016 | Krishnan | G06Q 30/0643 |
| 9,947,029 | B2* | 4/2018 | Collette | G06Q 30/0275 |
| 2005/0071249 | A1* | 3/2005 | Nix | G06Q 30/06 705/26.8 |
| 2006/0242056 | A1 | 10/2006 | Walker et al. | |
| 2007/0055616 | A1* | 3/2007 | Clay | G06Q 30/08 705/37 |
| 2007/0288350 | A1* | 12/2007 | Bykowsky | G06Q 30/0273 705/37 |
| 2008/0097838 | A1* | 4/2008 | Lin | G06Q 30/02 705/14.46 |
| 2009/0164383 | A1* | 6/2009 | Rothman | G06Q 30/0206 705/80 |
| 2012/0030056 | A1 | 2/2012 | Monsanto | |
| 2012/0130772 | A1* | 5/2012 | Hatfield | G06Q 30/0206 705/7.35 |
| 2014/0067582 | A1 | 3/2014 | Wolfram | |

OTHER PUBLICATIONS

Jun Tan, Yan-Jiang Jia, Online bidding system based on Cournot model using K-means clustering, Aug. 1, 2014, 2014 11th International Conference on Fuzzy Systems and Knowledge Discovery (FSKD) (pp. 363-368). (Year: 2014).*

Hongyan Yu, Chenyan Zhang, Zhongying Liu, Sep. 1, 2008, 2008 IEEE Symposium on Advanced Management of Information for Globalized Enterprises (AMIGE) (pp. 1-5). (Year: 2008).*

* cited by examiner

SYSTEM AND METHOD FOR ONLINE TIME-PRICE BASED MARKETPLACE AND UNIQUE MANIPULATIONS OF LISTINGS

FIELD

The present disclosure relates to online marketplaces and E-commerce, and in particular to an online time-price based marketplace with manipulations of listings.

BACKGROUND

Electronic commerce (E-commerce) websites are known in the art which allow a user to view and purchase products and services in an online marketplace, with products and services listed on a website. A simple E-commerce website is AMAZON.COM with a "Buy it Now" feature, with items only able to be purchased for one static price, unless there is a sale or the user has a promotional ("promo") code for reducing the price.

Other E-commerce websites conduct auctions on items, allowing multiple users to bid on and win items. EBAY.COM uses a straight auction, such that a seller lists an item for sale, and the highest bidder at the end of the auction wins. DEALDASH.COM uses a token auction, by which users pay for tokens and use the tokens to bid for items. TOPHATTER.COM has auctions which last a short time, such as 90 seconds, with the highest bidder at the end of the brief auction winning the item. However, none of these E-commerce websites take into account the possibility of automatically adjusting the price so that the price will fall into a preferable price range or will rise and thus creating an urgency to buy.

Straight auctions have something similar with regard to creating an urgency to buy a product. For example, U.S. Published Application No. 2014/0067582 A1 discloses an auction system which sets a timer to measure how long a bidder is a highest bidder, and then gives incentives or rewards to a bidder depending on the length of time the bidder is a highest bidder. Accordingly, the prospect of rewards separate from the bidding process encourages bidding to be a highest bidder. However, the urgency to bid or to buy is created only if someone else is bidding against the current bidder or buyer. Such known E-commerce and auction websites cannot manipulate the prices and lack aspects for gamification of the auction process.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

A system and method of the present invention host an electronic marketplace in which the initial product prices are set by the selling party and the final purchase price is determined by the time between product posting and payment received from a buyer. As described herein, the term "product" is understood to be any purchasable item, goods, and/or a service which can be delivered, implemented, granted easement, easement in gross, given rights to, transferred, conveyed, assigned, endorsed and/or otherwise fulfilled, booked, reserved, claimed by any merchant services such as fulfillment systems known in the art. Some examples include but are not limited to assets, instruments, real estate, rental units, reservations, accommodations, fares, events, tangibles, intangibles, digital items, memberships, subscriptions, titles, deeds, insurance, etc. Gamification is implemented using purchasable powerups to allow users, buyers or sellers, to manipulate the prices and duration of listings.

The system and method of the present invention generally include a data processing system configured to receive an uploaded product listing from a seller proposing a starting price. The product seller determines one of two sales methods: UP or DOWN. The system determines that the seller has set one of the two sales methods, and sets the initial price as a benchmark. The system notes the start value and checks the time using a programming scripting language or server-side language and database verification.

The seller will have two options as to the increment rate of the price of the product: automatic or manual. In the automatic incrementation setting, the server increments the final price of the product by cross-referencing the time and the product seller's inputted choice of UP or DOWN at the time of posting. The price at the moment of time calculation by the system becomes the new benchmark. The system tracks a period of time during which the listing is posted, the product is sold, and the listing has expired or has been terminated by either the seller or an administrator. The system allocates, in increments to the product price, an amount based on the period of time that has passed since the listing of the product and adjusts the remaining time left in the listing. Alternatively, in the manual incrementation of the price, the seller will select the speed in which the price is increased or decreased from the start of the listing to the end of the listing. A buyer purchases the product for the current price calculated by the system at the moment of payment determined by a payment gateway reflecting a successful confirmation of the sale of the listed product. If there are multiple products available and listed in the same listing and a product is purchased by a first buyer, this will not affect the price, incrementally or otherwise, of the remaining products if a subsequent product is purchased by a second buyer. If there is a single product listed by the seller, when the item is purchased and the payment is confirmed at the current price indicated by the system, the listing will close.

Systems and methods of the present invention also manipulate an online product listing in regards to the length of time of the listing and the price of the listing using gamification of the shopping experience, such as using features known as "powerups" or other mechanisms for manipulating the price and duration of the listing or product.

In one embodiment, the present invention includes a system comprising: a database storing a product listing corresponding to a product; and a server displaying the product listing on a webpage; receiving user inputs from a user computer for a first user to purchase the product at a final product price; receiving a proposed initial product price from a seller; setting the proposed initial product price to be a benchmark; determining changes to a current product price from the benchmark in relation to a current time, price movement direction and an initial posting time of the product listing; and determining the final product price from the current product price upon occurrence of a purchase finalizing event. The current product price changes incrementally. A speed of the incremental changes is set by the seller. The speed of the incremental changes is set in relation with initial, minimum and maximum price values set by the seller compared to a length of time of duration of the product listing. The final product price equals the benchmark adjusted for a calculated current increment value based on the amount of time that has passed from the start of the product listing. A fulfillment system is also included for delivering the product purchased by the first user. The fulfillment system includes a payment processing system; and the purchase finalizing event is finalization of payment of the product by the payment processing system. The user inputs include a powerup input from the first user; and the server responds to the powerup input to manipulate the current product price. The server conducts a listing of the product among a plurality of users including the first user; and wherein the manipulation of the current product price causes the first user to win or otherwise claim to purchase the product. The powerup input has an effect on the current product price and/or listing duration selected from the group of increasing the current price, decreasing the current price, preventing the current price from changing for a predetermined amount of time, resetting the current price to the benchmark, setting the current price to the ending listing price, undoing the previous used powerup effect on the product listing, and blocking changes or manipulations to the listing price or listing duration in its entirety.

In another embodiment, the present invention includes a method including storing a product listing corresponding to a product in a database; displaying the product listing on a webpage; receiving, at a server, user inputs from a user computer for a first user to purchase the product at a final product price; receiving a proposed initial product price from a seller; setting the proposed initial product price to be a benchmark; determining changes to a current product price from the benchmark in relation to a current time, price movement direction and an initial posting time of the product listing; and determining the final product price from the current product price upon occurrence of a purchase finalizing event. The current product price changes incrementally. A speed of the incremental changes is set by the seller. The speed of the incremental changes is set in relation with initial, minimum and maximum price values set by the seller compared to a length of time of duration of the product listing. The final product price equals the benchmark adjusted for a calculated current increment value based on the amount of time that has passed from the start of the product listing. The product purchased by the first user is delivered using a fulfillment system.

In a further embodiment, the present invention includes a system for conducting an electronic listing comprising: displaying a product listing of a product on a website; receiving, at a server, for the product from a plurality of users, including a first user; receiving a powerup input from the first user; and responsive to the powerup input, manipulating the current product price and/or duration of the listing, thereby causing the first user to purchase the product. A fulfillment system delivers the product purchased by the first user.

BRIEF DESCRIPTION OF DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left may be used to describe the accompanying figures. The terminology includes the words above specifically mentioned, derivatives thereof, and words of similar import.

Figure 1:
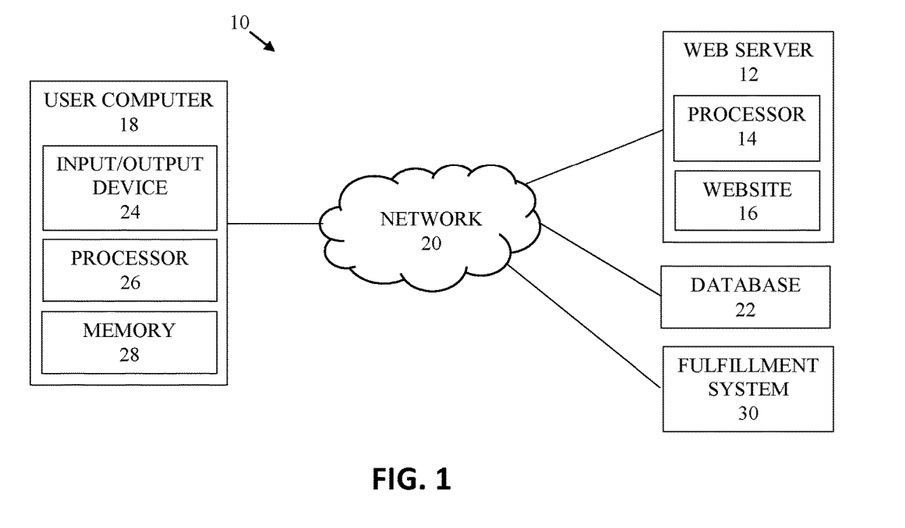
FIG. 1 is a schematic of the E-commerce system of the present invention.

As shown in FIG. 1, the system 10 and method of the present invention are implemented by a web server 12 which includes a processor 14 for operating a website 16 for hosting a multi-seller marketplace in which product prices are based explicitly on the time and on seller input. The seller may be an individual posting a product for sale, or a professional vendor displaying an inventory of available products. The web server 12 is accessible by multiple users, with each user using a respective user computer 18 communicating through a network 20, such as the Internet and/or other communication interfaces, to the web server 12. The web server 12 also accesses a database 22 of seller information, including data on the seller products, through the network 20. In an alternative embodiment, the web server 12 includes the database 22. The web server 12 maintains an internal clock and/or a timer for generating timestamps, and otherwise for tracking the time between events, as described herein.

Figure 5:
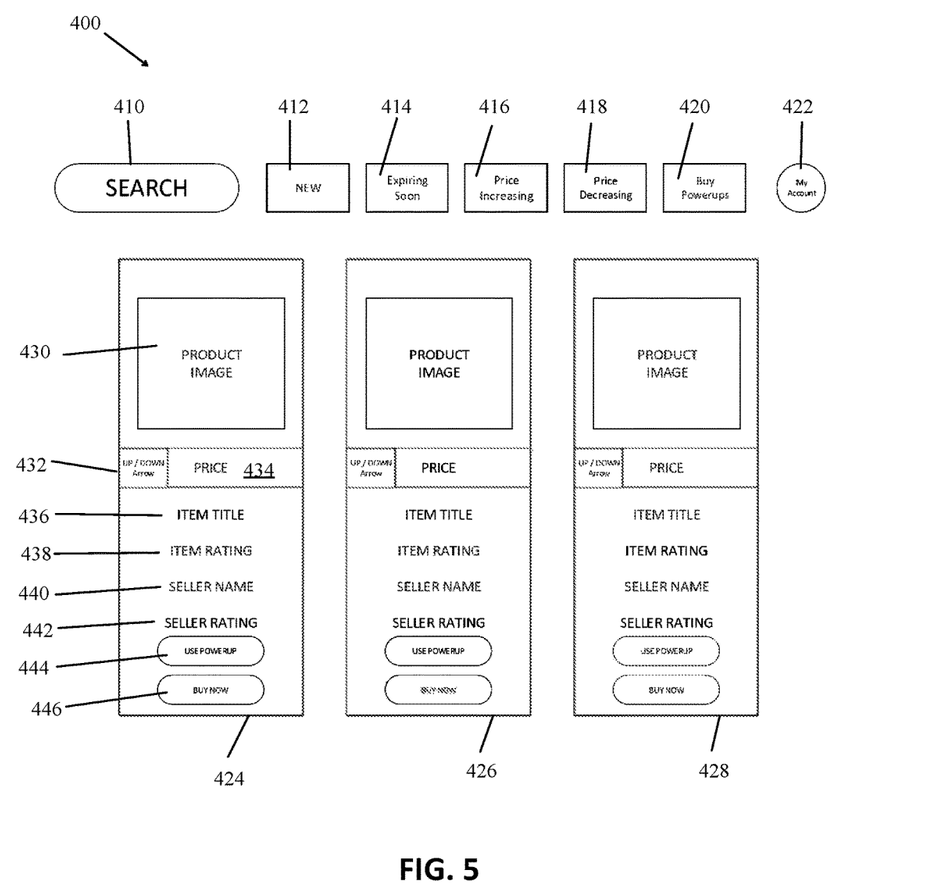
FIG. 5 illustrates a graphic user interface (GUI) on a screen of a display.

The user computer 18 includes an input/output device 24, such as a display, a keyboard, and/or a mouse for displaying and interacting with a graphic user interface (GUI) displaying a web page of the website 16, such as the web page 400 shown in FIG. 5. The user computer 18 also includes a processor 26 and a memory 28 for implementing and interacting with the GUI displayed on the input/output device 24 to view and select products in the multi-seller marketplace.

By implementing the multi-seller marketplace, the system 10 and method of the present invention allow users to purchase products or services, which are delivered by merchant services, such as a fulfillment system 30 known in the art. The fulfillment system 30 may be any known system for fulfilling or otherwise delivering a product, such as AMAZON.COM or other electronic commerce (E-commerce) and merchant systems. As described herein, the term "product" is understood to be any purchasable item, goods, and/or a service which can be delivered, implemented, granted easement, easement in gross, given rights to, transferred, conveyed, assigned, endorsed and/or otherwise fulfilled, booked, reserved, claimed by any merchant services such as the fulfillment system 30. Some examples include but are not limited to assets, instruments, real estate, rental units, reservations, accommodations, fares, events, tangibles, intangibles, digital items, memberships, subscriptions, titles, deeds, insurance, etc.

Figure 2:
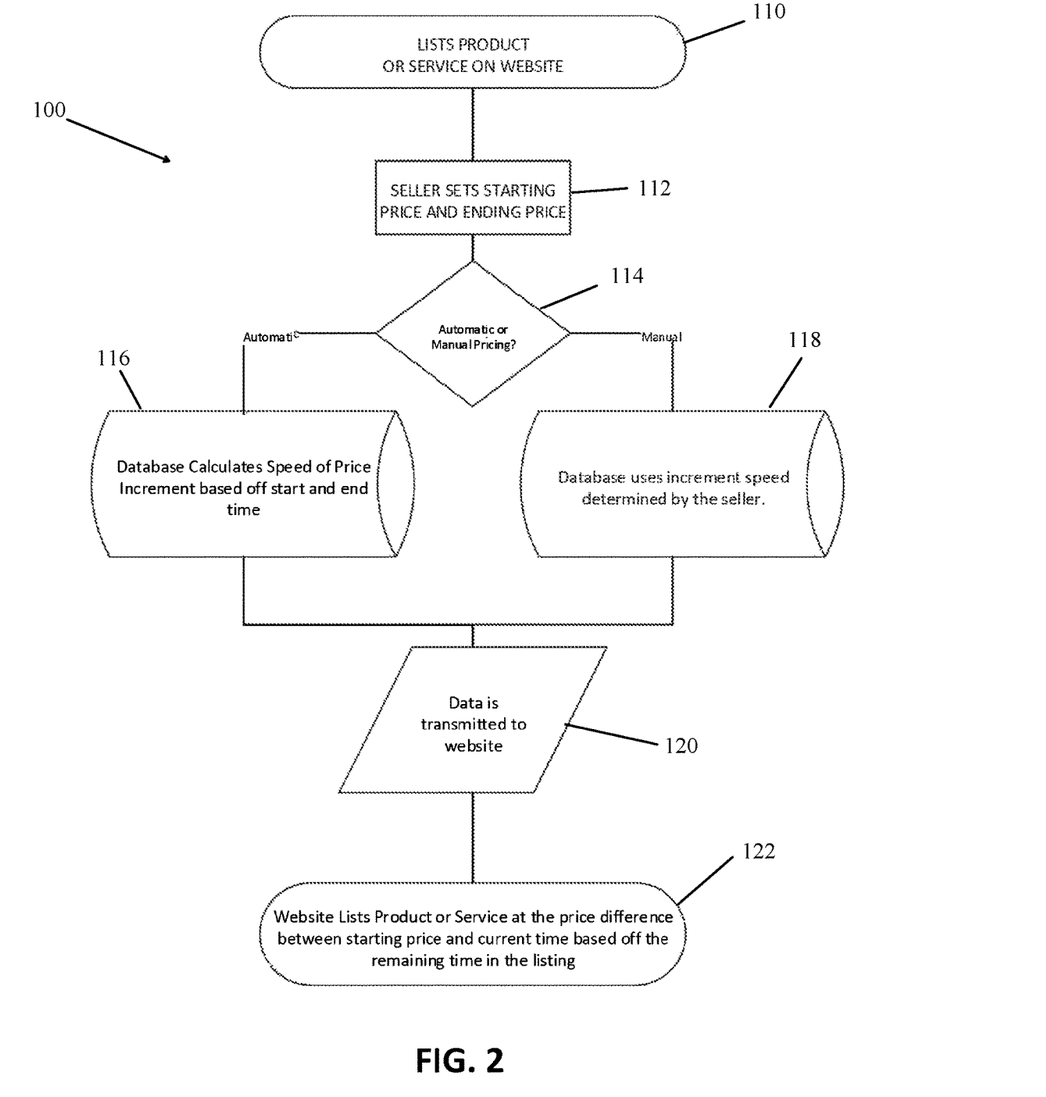
FIG. 2 is a flowchart in which products and their prices are set up in an database.

Referring to FIG. 2, a method 100 sets up products and their prices in the database 22, and lists the products and their prices on the website 16. In step 110, the seller or other provider lists products on the website 16, and in step 112, the seller sets the starting price and the ending price of the product. The initial value of the starting price is a benchmark. Due to price changes, it may be possible that future prices will never be the same as the initial or final benchmark value. In step 114, the seller sets the pricing to be automatic or manual, and the seller also sets the pricing to be incremented or decremented; that is, the price will be incrementally changed UP or DOWN, as determined by the seller. The product price then increases or decreases incrementally, directly correlated to the current time and the initial posting time over the course of the listing of the product being active, and depending on the seller's settings to be automatic or manual, and UP or DOWN. For example, the web server 12 checks the time using a programming scripting language, such as JAVASCRIPT, PHP, SQL or other known scripting or server-side languages, which acts as a timer or internal clock of the web server 12, and using database verification of the benchmark and current time based on an internal clock of the database 22. The speed of the incrementing/decrementing of prices is determined by the starting price of the listing and speed of incrementing/decrementing set by the seller including the calculation of time using a timer until the end of the listing period. Alternatively, the speed of the incrementing/decrementing of prices is determined by the calculation of the initial, minimum and maximum values set by the seller and the calculation of the starting, minimum and maximum values in relation to the length of time of the listing.

In automatic pricing in step 116, the database 22, or alternatively the web server 12, calculates the speed of the price increment/decrement based off of the start time and the end time of the listing using the timer. In manual pricing in step 118, the database 22, or alternatively the web server 12, uses an increment/decrement speed determined by the seller. The data regarding the pricing of the product in steps 116 and 118 is then sent to the website 16 in step 120 for display to the user, and in step 122, the website 16 lists the product at the price difference between the starting price and the current time based off of the remaining time in the listing.

Figure 3:
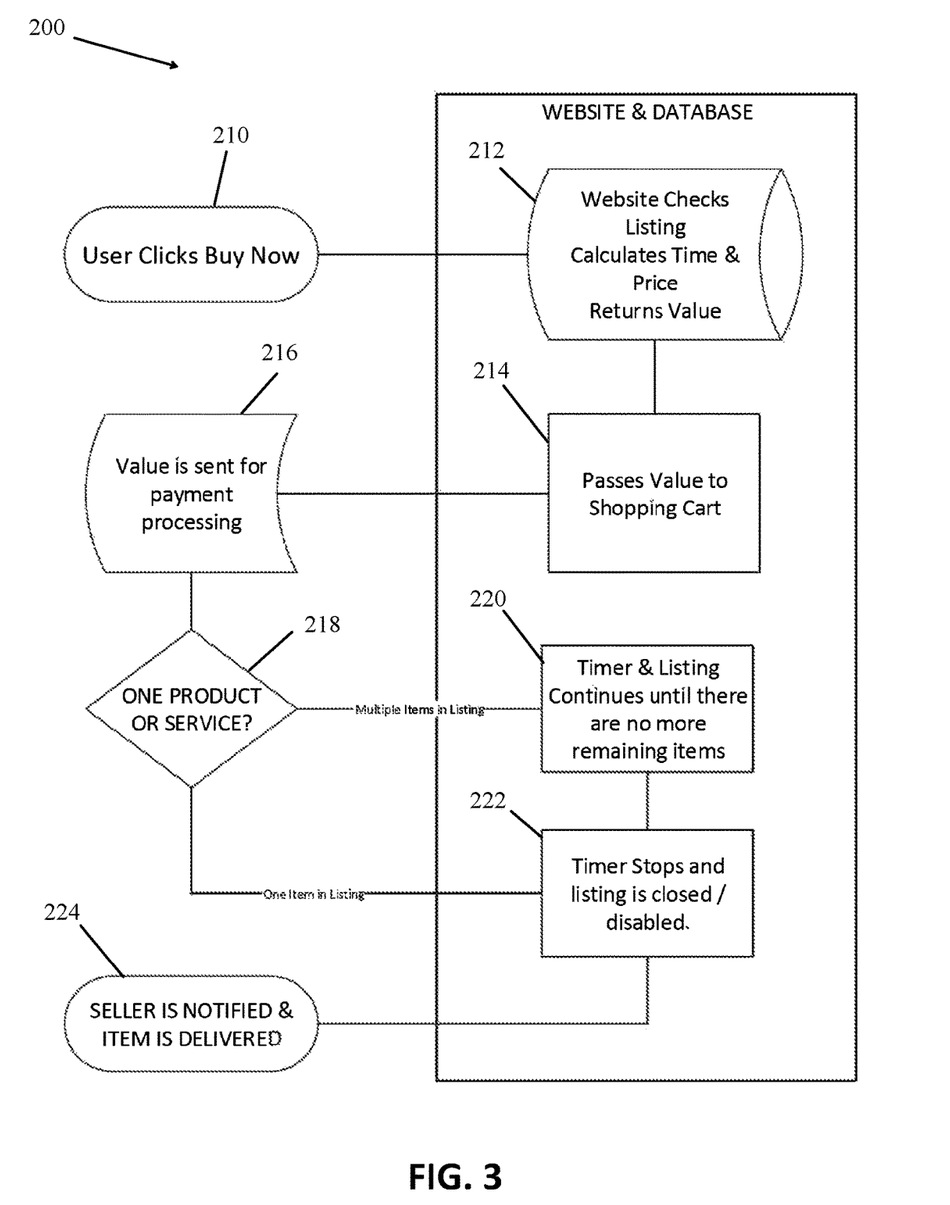
FIG. 3 is a flowchart in which a purchase selection by a user is processed.

Referring to FIG. 3, a method 200 processes a purchase selection by a user. When viewing the GUI on the webpage 400 in FIG. 5 on a screen of the display included in the input/output device 24 in FIG. 1, the user clicks or otherwise actuates a "Buy Now" icon in step 210. In response, the website 16, or alternatively the web server 12 or the database 22, checks the listing of the product selected by the user, and calculates the time and the prices, and finally returns the price value in step 212. The website 16 then passes the price value to an electronic shopping cart in step 214, which stores the selection of the product being purchased but continues to increment the price. The price value is then sent for payment processing by a payment processing system in step 216, which may be part of the fulfillment system 30. The method then determines, in step 218, if one product or multiple products are being purchased. If multiple products are in the listing, the website 16 processes the products and their prices using a timer in step 220, and the listing of the multiple products continues on the website 16 until there are no more remaining products in the listing. The timer for the product value is then stopped in step 222 and the listing for the product is closed or disabled on the website 16. Alternatively, in step 218, if there is only one product in the listing, the method proceeds directly to step 222. Then the seller is notified of the purchase of the product and the purchase price of the product, and the product is delivered by the fulfillment system 30 in step 224.

Figure 4:
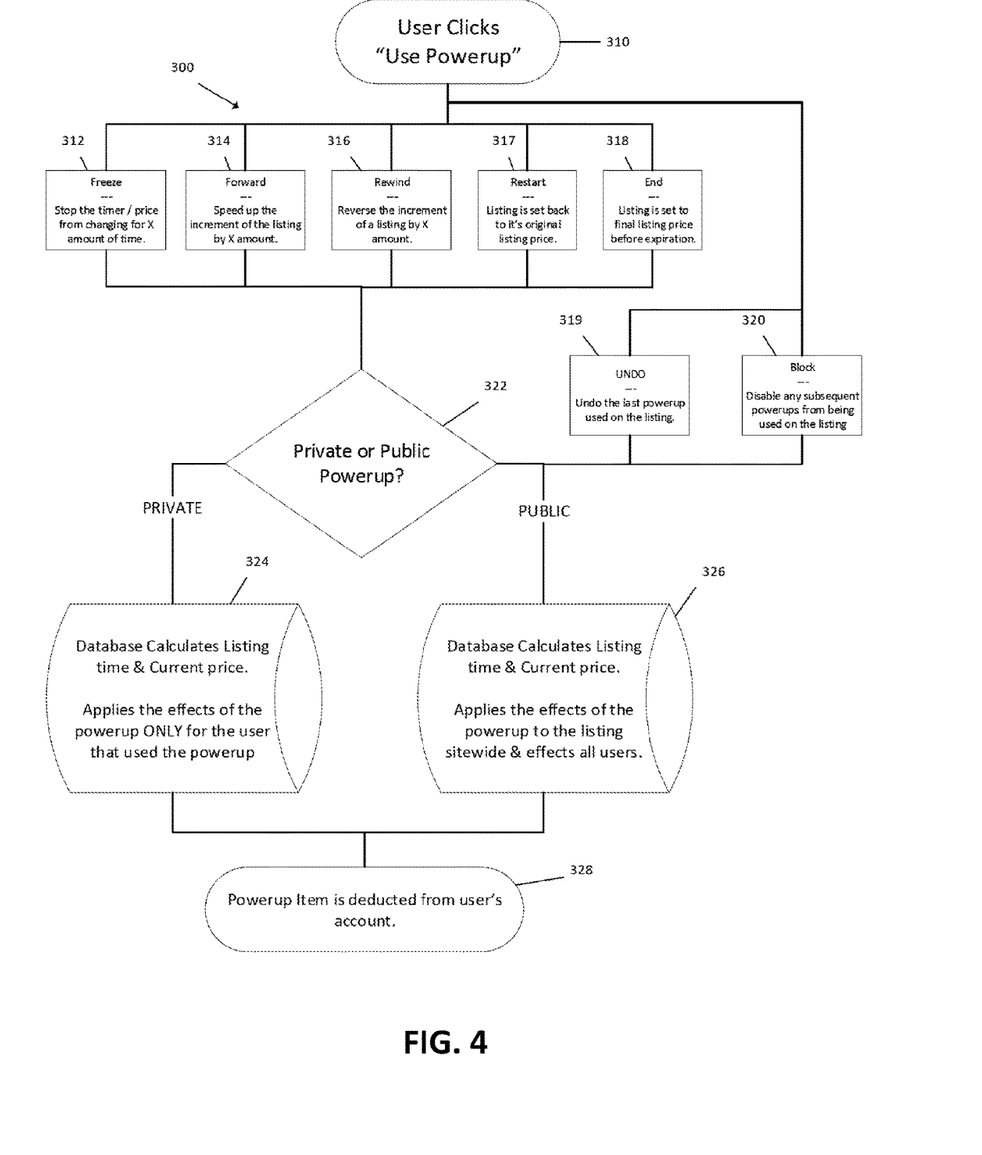
FIG. 4 is a flowchart in which a powerup selected by a user is processed.

Referring to FIG. 4, a method 300 processes a powerup selected by a user, in which the user may be a buyer or a seller who purchases or otherwise obtains a powerup. For example, the user, whether a buyer or a seller, may earn the choice of a powerup depending on pre-set rules such as that the buyer bought more than a specific number of products. Earning different powerups may depend on corresponding different rules and circumstances. Such powerups are purchased, for example, using real money, such as by direct monetary transfer, by credit card, by BITCOIN or other cryptocurrency, or other types of financial transactions. Upon use of a powerup on a specific product listing, a percentage of the cost of the used powerup may optionally be shared with the seller of the product in the specific listing.

When viewing the webpage 400 in FIG. 5, the user clicks or otherwise actuates a "Use Powerup" icon in step 310. In response, the website 16, or alternatively the web server 12 or the database 22, processes a selected or available powerup in steps 312-320. Powerups are electronic tokens with the specific purpose of affecting the listing price and listing duration by either increasing the price of the listed product, decreasing the price of the listed product, preventing the price of the listed product to change, resetting the listing to its starting or ending price, undoing price changes of the listed product, or blocking the use of powerups which effectively creates a listing that is only affected by incrementing or decrementing time price value. Thus, the system 10 and method of the present invention provides aspects of gamification using such powerups for the manipulation of prices during the purchase of a product by a buyer.

The buyer or seller are able to purchase the following electronic tokens as powerups: Freeze, Forward, Rewind, Restart, End, Undo and Block. The system 10 and method of the present invention calculate the price of the product in accordance with an original listing timestamp, such that the difference between the current time and the original listing timestamp is taken into account, as well as taking into account if any powerups are affecting the current listing price and duration of the listing.

In step 312, a 'Freeze' powerup causes a pause in the listing to stop the timer, such that the price does not decrease or increase for a set duration of time and/or the duration of the listing increases which does not affect the price. In step 314, a 'Forward' powerup speeds up the increment of the listing to cause a decrease in the remaining time on the listing by a set amount, which then allows for increasing or decreasing of the price. In step 316, a 'Rewind' powerup reverses the increment of a listing by a set amount, which causes an increase in the remaining time on the listing by the set amount and therefore increasing or decreasing the price. In step 317, a 'Restart' powerup causes a restart of the listing at the starting price, such that the listing is set back to its original listing price or benchmark. In step 318, the 'End' powerup causes the listing's current price to be set to the final seller specified price. In step 319, the 'Undo' powerup causes a previously used powerup on the listing to be deleted/nullified and brings the listing to the state before the previous powerup was applied. In step 320, a 'Block' powerup disables the use of any other powerup as well as previously and subsequently activated powerups from being used on the listing of a product.

The method then determines if the powerup is public or private in step 322. If private, the powerup affects the listing for only the user, as a buyer or a seller, who purchased the powerup for that use. The database 22, or alternatively the web server 12, calculates the listing time and the current price in step 324, and applies the effects of the powerup only for the user that used the powerup; that is, only the products selected for purchase by the user of the powerup are affected by the powerup. However, if the method determines in step 322 that the powerup is public, the powerup affects the listings of a product for all buyers and sellers using the website 16 in a site-wide effect, so that the database 22, or alternatively the web server 12, calculates the listing time and the current price in step 326, and applies the effects of the powerup to the listing of a selected product site-wide and affects all users. The Freeze, Forward, Rewind, Restart and End powerups are either private or public; that is, have a private effect or a public effect. However, the Undo and Block powerups are only public; that is, the Undo powerup only has a public effect whereas the previous powerup used on the listing is deleted from the calculation of the listing price and listing duration. Similarly, the Block powerup only has a public effect to block or otherwise disable any subsequent powerups from being used on the listing. After the powerups are processed in steps 310-326, the specifically-used powerup or token is deducted from the user's account in step 328.

Referring to FIG. 5, a webpage 400 displaying a graphic user interface (GUI) is shown which allows a user to search for and purchase products. By actuating a Search icon 410, the user prompts the web server 12 to generate various input fields and/or sub-windows known in the art (not shown) for searching for products. The user may refine the search by actuating a New icon 412 for limiting the search to new products or new listings of products, by actuating an Expiring Soon icon 414 for limiting the search to product listings that will expire within a specific time period, by actuating a Price Increasing icon 416 for limiting the search to product listings with increasing prices, or by actuating a Price Decreasing icon 418 for limiting the search to product listings with decreasing prices. Actuation of the Buy Powerups icon 420 by the user causes the web server 12 to display an input field and/or a sub-window known in the art (not shown) allowing a user to buy a selected powerup from among the Freeze, Forward, Rewind, Restart, End, Undo and Block powerups. The prices of each type of powerup may be set by the system settings, or alternatively by an administrator of the system 10 and method of the present invention. A profit-sharing setting may be enabled or disabled by the administrator of the present invention or of a website whereas powerups that are used on a listing will credit to the seller's account, a percentage of the cost of any powerups used on the seller's listing. Actuation of the My Account icon 422 by the user causes the web server 12 to display an input field and/or a sub-window known in the art (not shown) allowing a user to see and/or edit information regarding the user's account, such as a user name, purchase information such as saved credit card account information, and the number and types of powerups available to the user.

As shown in FIG. 5, by conducting a search for a product, the user prompts the web server 12 to access the database 22 and to generate a listing of products on the website 16, in the form of sub-windows 424, 426, 428 displayed on the webpage 400 within the GUI. Each sub-window 424, 426, 428 includes a product image 430, an UP/DOWN Arrow icon 432 indicating the direction of the listing price incrementation, and a field 434 displaying the current price of the product shown in the product image 430, as well as other product information such as the item title 436, an item rating 438, the name 440 of the seller, and a rating 442 of the seller. Each sub-window 424, 426, 428 also includes a Use Powerup icon 444 which is actuated in step 310 in FIG. 4, and includes a Buy Now icon 446 which is actuated in step 210 in FIG. 3.

In an example of implementation of the present invention, changing a price using a powerup may also affect a listing duration. For example, for an initial listing benchmark of $100, the benchmark may go up to $200, and the listing duration may be five days. Suppose an increment of speed is one hour, after a public Forward powerup is activated by twenty-four users, or alternatively by any number of users totaling twenty-four times, the new listing duration becomes four days from the current time, with the current listing price being, for example, $120.

In another example, the same types of uses of powerups may be applied to cause a downward effect. For example, a listing can be extended as opposed to being shortened as in the previous example. However, the duration of a listing can never go past a minimum or maximum setting of a duration of a listing, which may be set by the system administrator. In the current example, at a fourth day of a five-day listing, a Restart powerup may be used to reset the listing to the first day, thereby effectively causing the listing to have a nine-day duration.

Referring to FIGS. 1-5, using the present invention, the buyer purchases and receives the product at the proposed initial value plus or minus the calculated current increment value based on the amount of time that has passed from the start of the listing of the product and optionally the calculated costs of powerups used on the listing. A seller sells a single product or multiple products of a similar type or nature in a single listing, and a buyer purchases the product at a calculated value determined by the current time, unaffected by other purchases made by subsequent buyers. No purchase or sale is affected by the buying actions of another buyer unless the initial buyer ends the listing by procuring the only product listed. The action of buying a listed product will not stop the price from increasing or decreasing until the sale has been finalized by the payment gateway, such as a payment processing system of the fulfillment system 30. For example, products in the checkout stage or an electronic shopping cart associated with a specific user will continue to increment in value until processed by merchant services. In an alternative embodiment, the incrementing in value of selected products may be turned on or off when the product is in the shopping cart. The first value is a value determined by the seller plus or minus an incremental value over a period of time determined by the seller, during manual incrementing, or the length of time of the proposed listing in conjunction with the system calculated time value during automatic incrementing. The value is based on a quantity of time units which have passed since the initial proposed posting/listing benchmark. The current value is determined for each time unit which has passed in the determined quantity and calculated by the web server 12 using a scripting or server-side language, such as JAVASCRIPT, PHP, SQL or other known scripting or server-side languages, which acts as a timer or internal clock of the web server 12, or pre-determined by the seller.

The benchmark is a value higher or lower than any initial posted listing. Tracking the first period of time includes periodically checking the benchmark. Alternatively, tracking the first period of time includes computing an elapsed time from the first time and price to either of a time associated with the current system time check of the incremental value and a listing terminating event.

The system 10 and method of the present invention allow the purchasing of listed products to be conducted in the multi-seller marketplace with the web server 12, or alternatively the database 22, functioning as a listing server configured to receive a product listing from a seller as in step 112 in FIG. 2. The initial price, which the seller proposes as a first price value, determines the benchmark price so that the initial price is set to be the benchmark equal to the first price value. The web server 12 then tracks a first period of time during which the first value increases or decreases from the benchmark in steps 116 or 118, and, based on the first period of time, adds or subtracts an amount from the initial benchmark to arrive at the current calculated value.

The database 22, or alternatively the web server 12, acts as a listing server which is further configured to terminate the listing, such that the first value equals the benchmark plus or minus the time elapsed and applied in a financial respect to the final price value when the listing is terminated. The database 22 then ends the first period of time, and the fulfillment system 30 charges the first buyer the current calculated price value in the instance of a single product listing, as in step 212 in FIG. 3. The listing server is further configured to receive a second purchase from a second buyer at a second time, such that the second time is subsequent to the first time and the second purchaser proposes a second value plus or minus the benchmark value. The web server 12, which may be a listing server, then sets the benchmark equal to the current value, tracks a period of time until there are no items remaining for sale or a listing terminating event occurs as in step 222 in FIG. 3, and the second buyer will receive the aforementioned product at the current calculated price value at the time that the second buyer's payment is processed by merchant services, such as the fulfillment system 30, in step 224 in FIG. 3.

The web server 12 is further configured to receive a second purchase order from a second buyer at a second time, such that the second time is subsequent to the first time, and the second purchase is greater or less than a price value exceeding the initial benchmark price value, which continues repeatedly for each subsequent buyer, whereas the purchase price is the current calculated value or until there are no further products able to be purchased for the listing. Allotting the number of products to be sold in a single listing is based on the configuration of a system administrator, such as the seller. The database 22 and/or the web server 12 is configured to track the first period of time and the current calculated value by periodically checking the initial benchmark. The database 22 and/or the web server 12 is configured to track the first period of time and the current calculated price value by periodically checking the initial benchmark and comparing the benchmark to the increment value, such as the automatic increment value for automatic processing, or the seller's manually set increment value. The listing server is configured to track the first period of time by computing an elapsed time from the first time of the listing of the product to a subsequent time associated with termination of the listing.

The present invention may be embodied in other specific forms without departing from its spirit or essential characteristics. The described embodiments are to be considered in all respects only as illustrative and not restrictive. The scope of the invention, therefore, will be indicated by claims rather than by the foregoing description. All changes, which come within the meaning and range of equivalency of the claims, are to be embraced within their scope.

What is claimed is:

1. A system comprising:
   a database storing a product listing corresponding to a product; and
   a server displaying the product listing on a webpage;
      receiving user inputs from a user computer for a first user to purchase the product at a final product price, wherein the user inputs include a powerup input from the first user;
      receiving a proposed initial product price from a seller;
      setting the proposed initial product price to be a benchmark;
      determining changes to a current product price from the benchmark in relation to a current time and an initial posting time of the product listing, wherein the server responds to the powerup input to manipulate the current product price, wherein the powerup input has an effect on the current product price selected from the group of increasing the current product price, decreasing the current product price, preventing the current product price from changing for a predetermined amount of time, resetting the current product price to the benchmark, setting the current product price to the ending listing price, undoing the previous used powerup effect on the product listing, and blocking changes or manipulations to a listing price or a listing duration in its entirety, thereby causing the first user to purchase the product; and
      determining the final product price from the current product price upon occurrence of a purchase finalizing event.

2. The system of claim 1, wherein the current product price changes incrementally.

3. The system of claim 2, wherein a speed of the incremental changes is set by the seller.

4. The system of claim 3, wherein the speed of the incremental changes is set in relation with initial, minimum and maximum price values set by the seller.

5. The system of claim 4, wherein the speed of the incremental changes is set in relation with initial, minimum and maximum price values set by the seller compared to a length of time of duration of the product listing.

6. The system of claim 1, wherein the final product price equals the benchmark adjusted for a calculated current increment value based on the amount of time that has passed from the start of the product listing.

7. The system of claim 1, further comprising:
   a fulfillment system for delivering the product purchased by the first user.

8. The system of claim 7, wherein the fulfillment system includes a payment processing system; and
   wherein the purchase finalizing event is finalization of payment of the product by the payment processing system.

9. The system of claim 1, wherein the server conducts a listing service of the product among a plurality of users including the first user; and
   wherein the manipulation of the current product allows users to purchase the product at the current product price.

10. A method comprising:
    storing a product listing corresponding to a product in a database;
    displaying the product listing on a webpage;
    receiving, at a server, user inputs from a user computer for a first user to purchase the product at a final product price, wherein the user inputs include a powerup input from the first user;
    receiving a proposed initial product price from a seller;
    setting the proposed initial product price to be a benchmark;
    determining changes to a current product price from the benchmark in relation to a current time and an initial posting time of the product listing, wherein the server responds to the powerup input to manipulate the current product price, wherein the powerup input has an effect on the current product price selected from the group of increasing the current product price, decreasing the current product price, preventing the current product price from changing for a predetermined amount of time, resetting the current product price to the benchmark, setting the current product price to the ending listing price, undoing the previous used powerup effect on the product listing, and blocking changes or manipulations to a listing price or a listing duration in its entirely, thereby causing the first user to purchase the product; and
    determining the final product price from the current product price upon occurrence of a purchase finalizing event.

11. The method of claim 10, wherein the current product price changes incrementally.

12. The method of claim 11, wherein a speed of the incremental changes is set by the seller.

13. The method of claim 12, wherein the speed of the incremental changes is set in relation with initial, minimum and maximum price values set by the seller.

14. The method of claim 13, wherein the speed of the incremental changes is set in relation with initial, minimum and maximum price values set by the seller compared to a length of time of duration of the product listing.

15. The method of claim 10, wherein the final product price equals the benchmark adjusted for a calculated current increment value based on the amount of time that has passed from the start of the product listing.

16. The method of claim 10 further comprising:
    delivering the product purchased by the first user using a fulfillment system.

17. A method for conducting an electronic commerce marketplace comprising:
    displaying a product listing of a product on a website;
    receiving, at a server, a selection of a product from a plurality of users, including a first user;
    receiving, at the server, a powerup input from the first user; and
    responsive to the powerup input, manipulating the current product price by the server, wherein the powerup input has an effect on the current product price selected from the group of increasing the current product price, decreasing the current product price, preventing the current product price from changing for a predetermined amount of time, resetting the current product price to the benchmark, setting the current product price to the ending listing price, undoing the previous used powerup effect on the product listing, and blocking changes or manipulations to a listing price or a listing duration in its entirety, thereby causing the first user to purchase the product.

18. The method of claim 17, further comprising:
    delivering the product purchased by the first user using a fulfillment system.

* * * * *